United States Patent [19]

Harada et al.

[11] Patent Number: 4,763,543
[45] Date of Patent: Aug. 16, 1988

[54] TRANSMISSION FOR A WORKING VEHICLE

[75] Inventors: Denzaburo Harada; Masaharu Noguchi, both of Osaka, Japan

[73] Assignee: Kubota, Ltd., Osaka, Japan

[21] Appl. No.: 895,614

[22] Filed: Aug. 11, 1986

[30] Foreign Application Priority Data

| Sep. 30, 1985 | [JP] | Japan | 60-149437[U] |
| Sep. 30, 1985 | [JP] | Japan | 60-149435[U] |
| Sep. 30, 1985 | [JP] | Japan | 60-149438[U] |
| Sep. 30, 1986 | [JP] | Japan | 60-149436[U] |

[51] Int. Cl.⁴ .................................... F16H 37/00
[52] U.S. Cl. ............................ 74/740; 74/758
[58] Field of Search ................... 74/740, 758, 759

[56] References Cited

U.S. PATENT DOCUMENTS

| 2,690,086 | 9/1954 | Cook et al. | 74/740 |
| 2,772,582 | 12/1956 | Gerst | 74/740 |
| 3,482,469 | 12/1969 | Mori | 74/759 |
| 3,837,237 | 9/1974 | Rossler et al. | 74/740 |
| 3,915,033 | 10/1975 | Polak | 74/740 |
| 3,982,599 | 9/1976 | Herscovici et al. | 74/740 |
| 4,361,059 | 11/1982 | Kronogard | 74/759 |
| 4,594,914 | 6/1986 | Kubo et al. | 74/740 |
| 4,653,348 | 3/1987 | Hiraiwa | 74/759 |

Primary Examiner—Leslie A. Braun
Assistant Examiner—James W. Innskeep
Attorney, Agent, or Firm—Jordan and Hamburg

[57] ABSTRACT

A transmission for a working vehicle comprising a front frame and a rear frame interconnected to be pivotable relative to each other on a substantially vertical axis. The transmission is mounted together with an engine on the rear frame. A casing housing the transmission includes an upper case housing a change speed portion of the transmission and a lower case housing an output portion of the transmission. The upper case supports an input shaft operatively connected to the engine and surrounded by a planetary change speed gear assembly constituting the change speed portion. The planetary change speed gear assembly has an input gear mounted on a front portion of the input shaft and an output gear mounted on a rear portion of the input shaft. The lower case supports an output shaft operatively connected to the output gear. The output shaft includes a coupling device at a forward end thereof for connection to a propeller shaft for driving front wheels. The lower case has a front wall positioned rearwardly of a front wall of the upper case. The coupling device is positioned flush with or rearwardly of the front wall of the upper case.

7 Claims, 6 Drawing Sheets

TRANSMISSION FOR A WORKING VEHICLE

BACKGROUND OF THE INVENTION

The present invention relates to a transmission for a working vehicle equipped with a bucket implement or a backhoe implement, and particularly to a transmission for a working vehicle known as a body flexion type vehicle comprising a front frame including front wheels and a rear frame including rear wheels, the front and rear frames being interconnected to be pivotable relative to each other on a substantially vertical axis. This type of vehicle is steerable by pivoting the front frame relative to the rear frame.

Generally, the body flexion type working vehicle has an engine and a transmission mounted on the rear frame, with the transmission disposed forwardly of the engine. The transmission includes a planetary change speed gear assembly constituting an upper, change speed portion and an output shaft constituting a lower, output portion. In the known construction, the planetary change speed gear assembly has an input gear thereof disposed at or adjacent a rear end of the change speed portion and an output gear thereof disposed at or adjacent a front end of the change speed portion, the output gear being operatively connected to the output shaft.

Therefore, where the output shaft includes a coupling device at a front end thereof for connection to a propeller shaft for driving the front wheels included in the front frame, it is inevitable that the coupling device is positioned forwardly of a front wall of a case housing the change speed portion since the output gear for transmitting power to the output shaft is disposed at or adjacent the front end of the change speed portion. This results in a great maximum angle of deviation of the propeller shaft with respect to the output shaft at times of steering the vehicle by pivoting the front frame relative to the rear frame, which is contrary to good efficiency of power transmission to the front wheels.

In a further example of known transmission adapted for use in working vehicles not limited to the body flexion type working vehicle, the planetary change speed gear assembly comprises a first and a second planetary gear devices having respective carriers interlocked to be rotatable in unison. The first planetary gear device includes a sun gear operatively connected to the input shaft, and the second planetary gear device includes a sun gear operatively connected to an intermediate output shaft which in turn is operatively connected to the output shaft. This known transmission having such a construction is capable of effecting multistep speed changes. The input shaft and the intermediate output shaft of this known transmission extend longitudinally of the vehicle in an end-to-end arrangement. Therefore, the first and second planetary gear devices in combination have a great length in the fore and aft direction of the vehicle. It is also necessary to provide intermediate bearings at a position where the input shaft and the intermediate output shaft are opposed end to end. Thus the known transmission has the disadvantage of being large and cumbersome.

SUMMARY OF THE INVENTION

A first object of the present invention is to provide a transmission structure for use in a body flexion type working vehicle, which minimizes the maximum angle of deviation of a propeller shaft with respect to an output shaft when steering the vehicle by flexing the vehicle body.

In order to achieve this object, a transmission structure according to the present invention comprises a front frame including front wheels, a rear frame including rear wheels and connected to the front frame to be pivotable relative thereto on a substantially vertical axis, an engine and a transmission mounted on the rear frame, the transmission being disposed forwardly of the engine, a casing housing the transmission, the casing including an upper case housing a change speed portion of the transmission and a lower case housing an output portion of the transmission, an input shaft supported by the upper case and operatively connected to the engine, the input shaft being surrounded by a planetary change speed gear assembly constituting the change speed portion, an input gear and an output gear of the planetary change speed gear assembly, the input gear being mounted on a front portion of the input shaft, and the output gear being mounted on a rear portion of the input shaft, and an output shaft supported by the lower case and operatively connected to the output gear, the output shaft including a coupling device at a forward end thereof for connection to a propeller shaft for driving the front wheels, wherein the lower case has a front wall positioned rearwardly of a front wall of the upper case, and the coupling device is positioned flush with or rearwardly of the front wall of the upper case.

As noted above, the input gear of the planetary change speed gear assembly is mounted on a front portion of the input shaft and the output gear of the planetary change speed gear assembly is mounted on a rear portion of the input shaft. This permits the output shaft operatively connected to the output gear to be disposed rearwardly. Furthermore, the lower case has a front wall positioned rearwardly of a front wall of the upper case, and the coupling device is positioned flush with or rearwardly of the front wall of the upper case. Thus the coupling device is positioned further rearwardly. As a result, there is provided an increased distance between the front wheels and the coupling device, thereby minimizing the maximum angle of deviation of the propeller shaft and increasing the efficiency of power transmission to the front wheels at times of steering the vehicle by flexing the vehicle body.

Another object of the present invention is to provide a transmission structure suited for use in not only the body flexion type working vehicle but an ordinary working vehicle and having reduced dimensions in the fore and aft direction of the vehicle although the transmission includes a first and a second planetary change speed gear devices.

In order to achieve this object, a transmission structure according to the present invention comprises an input shaft operatively connected to an engine, a first planetary gear device and a second planetary gear device surrounding the input shaft and including carriers, respectively, which are interlocked to be rotatable together, the first planetary gear device further including a sun gear operatively connected to the input shaft, and an intermediate output shaft operatively connected to a sun gear of the second planetary gear device, the intermediate output shaft comprising a sleeve shaft and containing the input shaft to be rotatable relative to each other, and the intermediate output shaft being operatively connected to a further output shaft.

In the above construction, the intermediate output shaft comprises a sleeve shaft containing the input shaft to be rotatable relative to each other. Compared with the prior art construction having the two shafts arranged end to end to extend in the fore and aft direction of the vehicle, the construction according to the present invention permits the planetary change speed gear devices to be arranged compactly in the fore and aft direction. Moreover, since one of the two shafts is supported by the other, the intermediate bearings heretofore required may be dispensed with. This results in an entire transmission having a greatly reduced fore and aft dimension which is achieved such as by effectively utilizing the space required in the prior art for accommodating the intermediate bearings. Such a transmission may be manufactured more easily than the known transmission as a result of the smaller number of parts involved.

Other objects and advantages of the invention will be apparent from the following description.

BRIEF DESCRIPTION OF THE DRAWINGS

The drawings illustrate a transmission embodying the present invention, in which.

DESCRIPTION OF THE PREFERRED EMBODIMENTS

Figure 1:
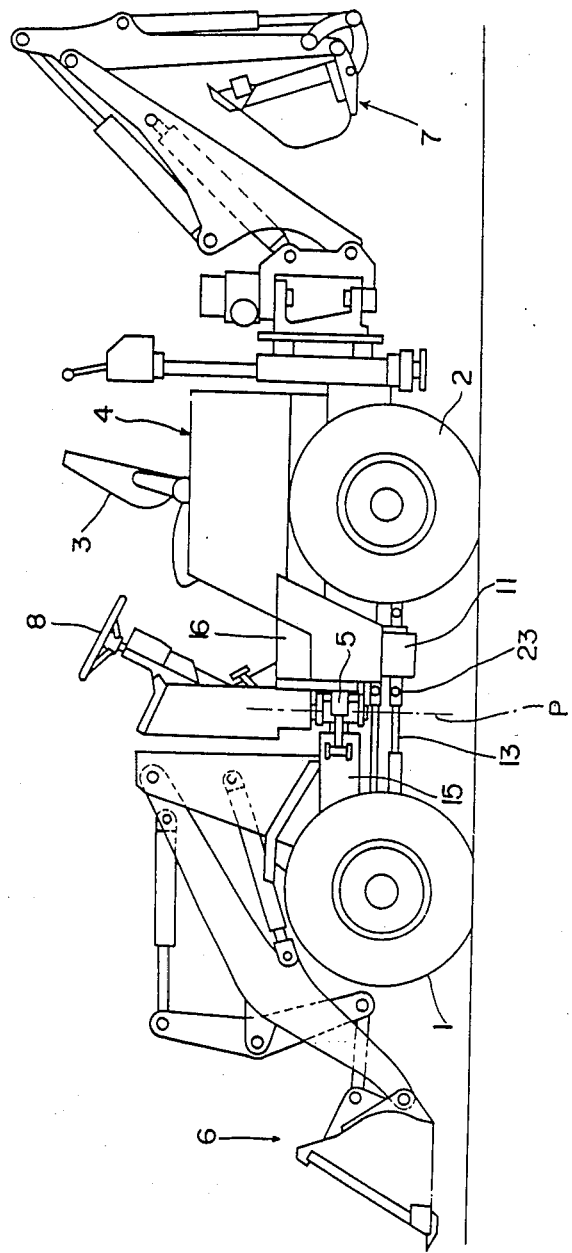
FIG. 1 is a side elevation of a working vehicle.

Embodiments of the present invention will be described hereinafter with reference to the drawings. FIG. 1 is a side elevation of a working vehicle known as the body flexion type vehicle which comprises a front frame 15 including a pair of right and left front drive wheels 1 and a rear frame 16 including a pair of right and left rear drive wheels 2. The front frame 15 carries a bucket implement 6 attached to the front end thereof, and the rear frame 16 carries a backhoe implement 7 attached to the rear end thereof. The rear frame 16 further carries a driver's seat 3, a motor section 4 and a steering wheel 8. The front and rear frames 15 and 16 are interconnected to be pivotable relative to each other on a substantially vertical axis P. A hydraulic cylinder 5 is mounted between the two frames 15 and 16. The vehicle is steered by turning the steering wheel 8 to actuate the cylinder 5 and cause the front frame 15 and the rear frame 16 to pivot relative to each other. The driver's seat may be turned round to change its facing direction for the driver's convenience in operating the bucket implement or the backhoe implement.

Figure 2A:
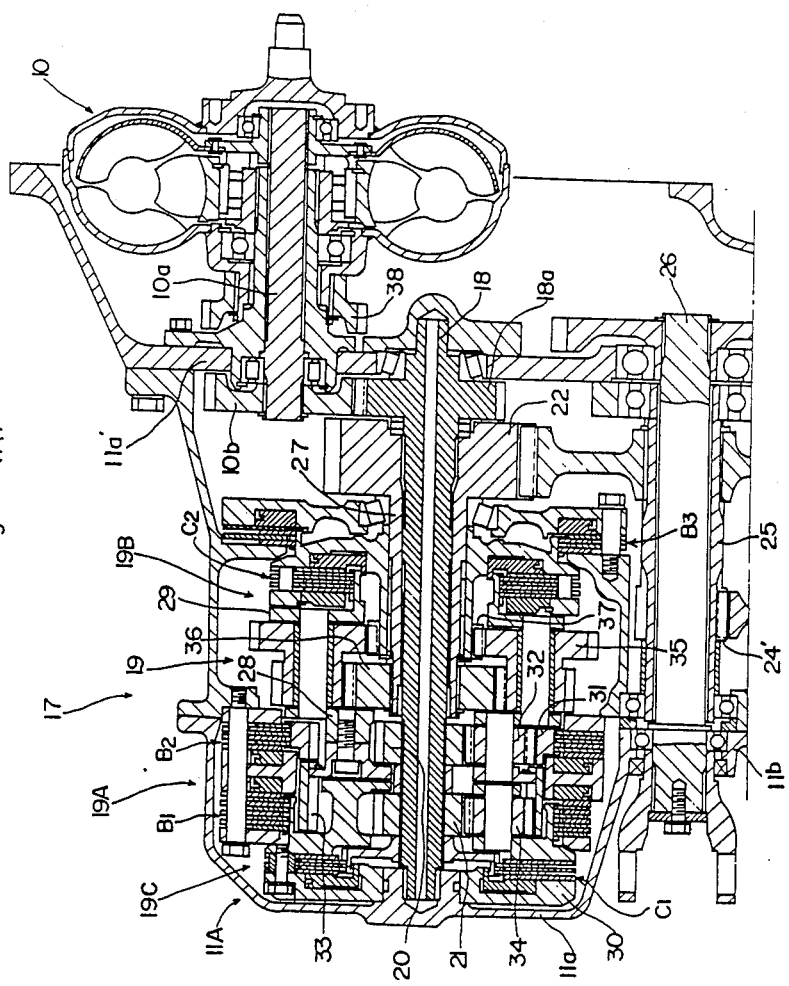
FIGS. 2 are views in vertical section of the transmission, FIG. 2(A) showing an upper portion and FIG. 2(B) showing a lower portion of the transmission.
Figure 2B:
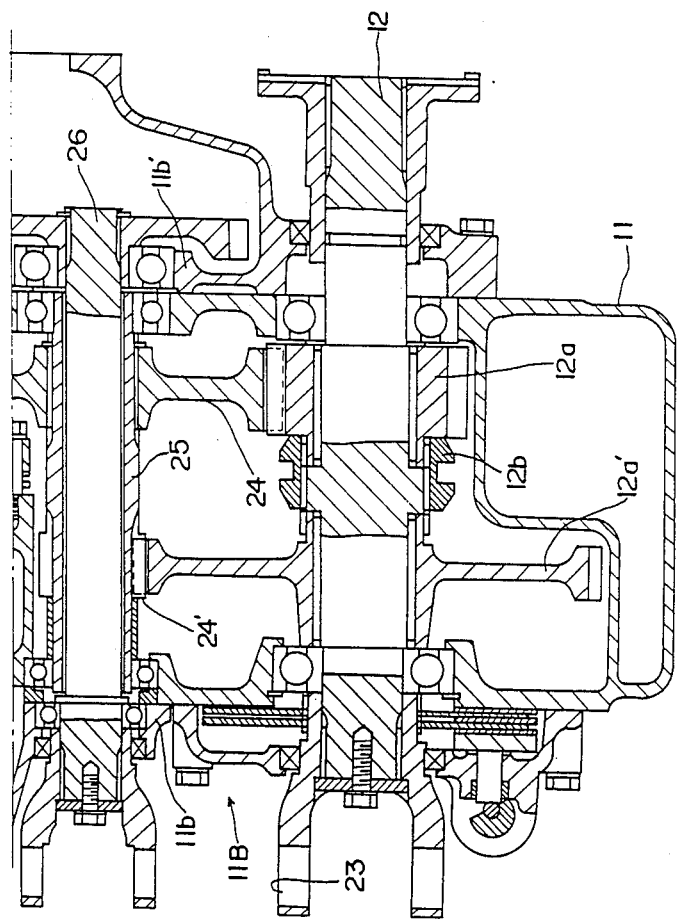
Figure 3:
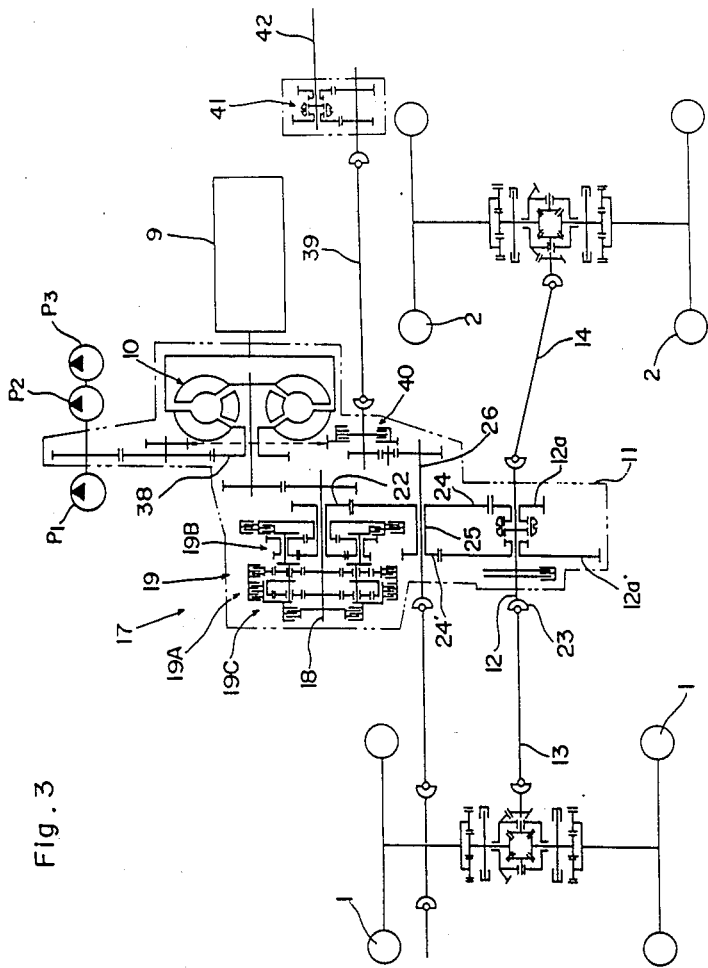
FIG. 3 is a developed view of an overall power transmitting system of the vehicle.

Referring to FIGS. 2A and 2B and FIG. 3 showing a power transmitting system for the front and rear wheels 1 and 2, the power of engine 9 mounted at a substantially mid-position transversely of the rear frame 16 is transmitted to a torque converter 10, and the output of torque converter 10 is transmitted through an output shaft 10a and a gear 10b fixed thereto to the transmission 17 mounted on the rear frame 16 forwardly of the engine 9. The power is further transmitted from an output shaft 12 of the transmission 17 to a propeller shaft 13 for driving the front wheels and to a propeller shaft 14 for driving the rear wheels.

The transmission 17 is housed in a casing 11 consisting of an upper case 11A which houses a change speed portion of the transmission 17 and a lower case 11B which houses an output portion thereof. The lower case 11B has a front wall 11a positioned rearwardly of a front wall 11b of the upper case 11A. An input shaft 18 is rotatably mounted to extend from the front wall 11a to a rear wall 11a' of the upper case 11A. The input shaft 18 carries a gear 18a fixed thereto and meshed with the gear 10b, and is surrounded by a planetary change speed gear assembly 19 constituting the change speed portion. The output shaft 12 is rotatably mounted to extend from the front wall 11b to a rear wall 11b' of the lower case 11B. The output shaft 12 has a coupling device 23 at a forward end thereof for connection to the propeller shaft 13 for driving the front wheels 1. The coupling device 23 is positioned rearwardly of the front wall 11a of the upper case 11A. This coupling device 23 comprises a universal joint to permit the propeller shaft 13 to swing relative to the output shaft 12.

Figure 4:
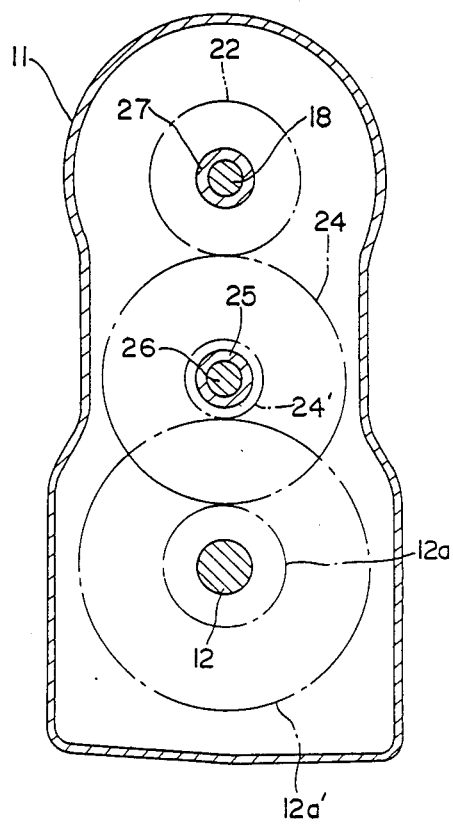
FIG. 4 is a sectional view showing an arrangement of an input shaft and an output shaft.

The planetary change speed gear assembly 19 includes a first planetary gear device 19A, a second planetary gear device 19B and a third planetary gear device 19C. The first planetary gear device 19A and the third planetary gear device 19C have respective sun gears 20 and 21 acting as input gears therefor. These input gears 20 and 21 are mounted at a forward portion of the input shaft 18, whereas an output gear 22 of the planetary change speed gear assembly 19 is mounted on a rear portion of the input shaft 18. The output gear 22 is operatively connected through an auxiliary change speed gear 24 to a gear 12a relatively rotatably mounted on the output shaft 12. The auxiliary change speed gear 24 is mounted on an auxiliary change speed shaft 25 rotatably supported by the lower case 11B. The input shaft 18, the auxiliary change speed shaft 25 and the output shaft 12 are arranged vertically, one above another, at a substantially mid-position transversely of the rear frame 16 as shown in FIG. 4. The auxiliary change speed shaft 25 comprises a sleeve shaft and contains a front power takeoff shaft 26 coaxial therewith which is operatively connected to the engine 9. The auxiliary change speed shaft 25 carries a further auxiliary change speed gear 24' fixed thereto, and the output shaft 12 carries a gear 12a' rotatable relative thereto and meshed with the auxiliary change speed gear 24'. Thus, two speeds are produced between the auxiliary change speed shaft 25 and output shaft 12 by sliding movements of a shifter 12b.

The first planetary gear device 19A comprises planet gears 32 rotatably attached to a carrier 28 and meshed with the input gear 20, and a ring gear 31 meshed with the planet gears 32. The third planetary gear device 19C comprises planet gears 34 rotatably attached to a carrier 30 and meshed with the input gear 21, and a ring gear 33 meshed with the planet gears 34. The carrier 28 of the first planetary gear device 19A is in mesh with the ring gear 33 of the third planetary gear device 19C. The third planetary gear device 19C is provided with a first clutch C1 for connecting the carrier 30 to the input shaft 18 to rotate in unison and disconnecting the carrier 30 from the input shaft 18 to permit relative rotation therebetween, and a first brake B1 for stopping and permitting the rotation of carrier 30. The first planetary gear device 19A is provided with a second brake B2 for stopping and permitting the rotation of ring gear 31.

On the other hand, the second planetary gear device 19B comprises a first sun gear 36 and a second sun gear 37 which are different in the number of teeth, planet gears 35 each having a pair of toothed parts different in the number of teeth and meshed respectively with the sun gears 36 and 37, and a carrier 29 rotatably supporting the planet gears 35.

The carrier 29 is rigidly connected by bolts or other means to the carrier 28 of the first planetary gear device 19A to be rotatable in unison. The first sun gear 36 is mounted on an intermediate output shaft 27 comprising a sleeve shaft mounted for relative rotation on the input shaft 18, the second sun gear 37 being mounted for relative rotation on the intermediate output shaft 27. Furthermore, the second planetary gear device 19B is provided with a third brake B3 for stopping and permitting the rotation of the second sun gear 37, and a second clutch C2 for connecting the second sun gear 37 to the carrier 29 to rotate in unison and disconnecting the second sun gear 37 from the carrier 29 to permit relative rotation therebetween.

Various operative states of the planetary change speed gear assembly 19 resulting from change speed operations will be described hereinafter. The planetary change speed gear assembly 19 is operable by the clutches C1 and C2 and the brakes B1, B2 and B3 to produce first (low) to fourth (high) forward speeds F and first (low) and second (high) backward speeds R, which are illustrated in the table below. In the table, the circles denote engagement of the clutches and application of the brakes.

| Speeds | B2 | B1 | C2 | B3 | C1 |
|--------|----|----|----|----|----|
| F 1    | o  |    |    | o  |    |
| 2      | o  |    | o  |    |    |
| 3      |    |    |    | o  | o  |
| 4      |    |    | o  |    | o  |
| R 1    |    | o  |    | o  |    |
| 2      |    | o  | o  |    |    |

To describe the above categorically:

(a) For the first forward speed: The second brake B2 and the third brake B3 are operated to stop the ring gear 31 of the first planetary gear device 19A and the second sun gear 37 of the second planetary gear device 19B. Then the planet gears 32 of the first planetary gear device 19A revolve round the input shaft 18 causing the carrier 28 to rotate. As a result, the power is first subjected to a change speed between the input gear 20 and the planet gears 32 in the first planetary gear device 19A. Further, in the second planetary gear device 19B the braking of the second sun gear 37 and the rotation of the carrier 29 in unison with the carrier 28 cause the planet gears 35 to rotate on their own axes and to revolve round the input shaft 18. As a result, the power is subjected to a further change speed between the planet gears 35 and the first sun gear 36 for transmission to the intermediate output shaft 27.

(b) For the second forward speed: The second brake B2 and the second clutch C2 are operated to stop the ring gear 31 and to connect the carrier 29 and second sun gear 37 together. Then, the planet gears 32 revolve round the input shaft 18 thereby to rotate the carrier 28. At the same time the first sun gear 36 rotates in unison with the carrier 28 through the second sun gear 37 and the planet gears 35. As a result, the power is subjected to a change speed only between the input gear 20 and the planet gears 32 of the first planetary gear device 19A for transmission to the intermediate output shaft 27.

(c) For the third forward speed: The third brake B3 and the first clutch C1 are operated to stop the second sun gear 37 of the second planetary gear device 19B and to rigidly connect the input shaft 18 to the carrier 30 of the third planetary gear device 19C. Thus, the rotation of the input shaft 18 is transmitted through the carrier 28 to the carrier 29 without any change speed effected by the first planetary gear device 19A. In the second planetary gear device 19B the second sun gear 37 is stopped and the rotation of the carrier 29 in unison with the input shaft 18 causes the planet gears 35 to revolve round the input shaft 18 and to rotate on their respective axes. As a result, the power is subjected to a change speed between the planet gears 35 and the first sun gear 36 for transmission to the intermediate output shaft 27.

(d) For the fourth forward speed: The first clutch C1 and the second clutch C2 are operated to rigidly connect the input shaft 18 to the carrier 30 of the third planetary gear device 19C as in the case of the third forward speed, and to rigidly connect the second sun gear 37 and the carrier of the second planetary gear device 19B. Thus, the planet gears 34 of the third planetary gear device 19C attached to the carrier 30 are rotatable with the input shaft 18, whereby the rotation of the input shaft 18 is transmitted through the carrier 28 to the carrier 29 without any change speed effected in the first planetary gear device 19A. In the second planetary gear device 19B, the carrier 29 and the second sun gear 37 are rigidly interconnected whereby the planet gears 35 revolve in unison with the carrier 29 without rotating on their axes. As a result, the rotation of the input shaft 18 is transmitted through the first sun gear 36 to the intermediate output shaft 27 without being subjected to any change speed.

(e) For the first backward speed: The first brake B1 and the third brake B3 are operated to stop the carrier 30 of the third planetary gear device 19C and the second sun gear 37. Then the planet gears 34 attached to the carrier 30 of the third planetary gear device 19C are driven to rotate by the input gear 21 mounted on the input shaft 18, which through the ring gear 33 causes the carrier 28 of the first planetary gear device 19A to rotate in a direction opposite to the direction in which the carrier 28 rotates in the foregoing speed states. In the second planetary gear device 19B, the braking of the second sun gear 37 changes the rotational speed of the carrier 29 through the planet gears 35 as in the speed states (a) and (c), which is transmitted to the intermediate output shaft 27.

(f) For the second backward speed: The first brake B1 and the second clutch C2 are operated. Then, as in the speed state (e), the carrier 28 of the first planetary gear device 19A is caused to rotate in the opposite direction. As in the speed state (b), the second sun gear 37 is connected to the carrier 29 to be rotatable in unison, whereby the rotation of the carrier 29 is transmitted to the intermediate output shaft 27 without being subjected to a change speed in the second planetary gear device 19B.

As noted in the speed states (a) to (f), the first planetary gear device 19A in cooperation with the third planetary gear device 19C provides two, high and low, forward speeds and, by the reversing operation, a backward drive, whereas the second planetary gear device 19B provides two, high and low, speeds. The combination of the three devices 19A, 19B and 19C, therefore, is capable of providing the four forward speeds and two backward speeds.

The clutches C1 and C2 and the brakes B1, B2 and B3 are operated by pressure oil provided through a transmission pump P1. The transmission pump P1, an implement pump P2 for actuating the bucket implement 6 and backhoe implement 7 attached to the working vehicle, and a steering pump P3 for steering the vehicle are operatively connected to the engine 9 directly and not through the transmission 17.

Figure 5:
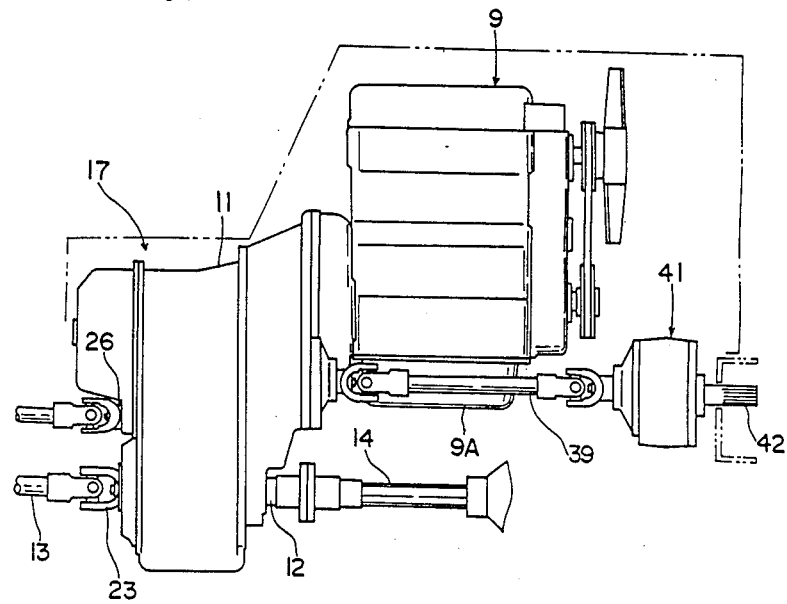
FIG. 5 is a side view of an engine and the transmission.
Figure 6:
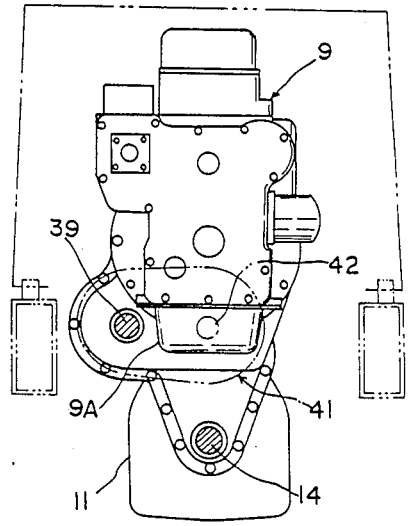
FIG. 6 is a partly broken away rear view of the engine and the transmission shown in FIG. 5.

As shown in FIGS. 2(A) and 3, the torque converter 10 and the transmission 17 are interposed by a transmission gear 38 in direct operative connection to the engine 9. This transmission gear 38 is also operatively connected through a suitable transmission mechanism to a rear power takeoff clutch 40 mounted on a front end of a rear power takeoff drive shaft 39 extending rearwardly. Thus, the transmission gear 38 is operatively connectable with and disconnectable from the drive shaft 39. Furthermore, the drive shaft 39 is operatively connected through a suitable transmission mechanism to the front power takeoff shaft 26. As shown in FIGS. 5 and 6, the drive shaft 39 extends along a lateral wall of an oil pan 9A provided under the engine 9 and having a small width, and is disposed more inwardly than a lateral wall of a large width portion of the engine 9 thereabove where exhaust and suction pipes are provided. In this manner, effective use is made of the space which would otherwise be a dead space. Compared, for example, with the case of disposing the drive shaft 39 between the oil pan 9A of the engine 9 and the propeller shaft 14 for driving the rear wheels, this construction permits the engine 9 to be disposed in a low position for improved stability. The drive shaft 39 is operatively connected at a rear end thereof, through a mechanical change speed device 41, to a rear power takeoff shaft 42 disposed at a rear end and a substantially midposition transversely of the rear frame 16. Since, as described above, the rear power takeoff shaft 42 is operatively connected to the engine 9 through the mechanical interlocking means instead of hydraulic means, power transmission to the rear power takeoff shaft 42 is carried out efficiently with little energy loss and a great torque may be transmitted to the rear power takeoff shaft 42.

While in the described embodiment the transmission structure according to the present invention is applied to the body flexion type working vehicle, this transmission structure may of course be applied to other types of working vehicle. The planetary change speed gear assembly 19 also may be modified in various ways without being limited to the described construction.

We claim:

1. A transmission for a body flexion type working vehicle comprising;
   a front frame including front wheels,
   a rear frame including rear wheels and connected to the front frame to be pivotable relative thereto on a substantially vertical axis,
   an engine and a transmission mounted on the rear frame, the transmission being disposed forwardly of the engine,
   a casing housing the transmission, the casing including an upper case housing a change speed portion of the transmission and a lower case housing an output portion of the transmission,
   An input shaft supported by the upper case and operatively connected to the engine,
   an output shaft supported by the lower case and including a coupling device at a forward end thereof for conection to a propeller shaft for driving the front wheels, and
   a planetary gear type change speed mechanism for changing power from the input shaft into plural speeds in forward and reverse rotations, respectively, for transmission to the output shaft, the planetary gear type change speed mechanism including;
   a first, a second and a third planetary gear type change speed devices formed integrally and having sun gears disposed forwardly of the input shaft, respectively,
   the first and second planetary gear type change speed devices having carriers, respectively, which are interlocked to be rotatable in unison, and having a gear arrangement for the change speed,
   the third planetary gear type change speed device having a ring gear connected to the carrier of the first planetary gear type change speed device to be rotatable in unison, and having a gear arrangement for the change speed in reverse rotation,
   brake means for effecting change speed switching, and
   clutch means for switching between forward and reverse rotations, and
   an output gear for outputting power changed by the planetary gear type change speed mechanism, the output gear being disposed rearwardly of the input shaft and operatively connected to the output shaft,
   wherein the lower case includes a front wall positioned rearwardly of a front wall of the upper case, and the coupling device is positioned flush with or rearwardly of the front wall of the upper case.

2. A transmission as claimed in claim 1 further comprising a tubular output shaft mounted on the input shaft to be rotatable relative thereto, a first sun gear of the second planetary gear type change speed device and the output gear being fixed to the tubular output shaft.

3. A transmission as claimed in claim 1 wherein said output gear and said output shaft are operatively connected to each other through an auxiliary change speed gear mounted on an auxiliary change speed shaft, and wherein said auxiliary change speed shaft, said input shaft and said output shaft are arranged vertically in a substantially middle position transversely of said rear frame.

4. A transmission as claimed in claim 3 wherein said auxiliary change speed shaft comprises a sleeve shaft and contains a front power takeoff shaft to be rotatably relative to each other.

5. A transmission as claimed in claim 4 wherein the first planetary gear type change speed device includes
   the sun gear fixed to the input shaft,
   planetary gears meshed with the sun gear,
   the carrier supporting the planetary gears, and
   a ring gear meshed with the planetary gears;
   the second planetary gear type change speed device includes
   a first sun gear fixed to the tubular output shaft,
   a second sun gear rotatable relative to the tubular output, and
   carrier means having a first gear portion meshed with the first sun gear and a second gear portion meshed with the second sun gear;
   the third planetary gear type change speed device includes the sun gear fixed to the input shaft,
planetary gears meshed with the sun gear,
a carrier supporting the planetary gears, and
a ring gear meshed with the planetary gear;
the brake means consists of a first, a second and a third brakes,
the first brake being adapted to fix the carrier of the third planetary gear type change speed device to the casing,
the second brake being adapted to fix the carrier of the first planetary gear type change speed device to the casing, and
the third brake being adapted to fix the second sun gear of the second planetary gear type change speed device to the casing, and
the clutch means consists of a first and a second clutches,
the first clutch being adapted to connect the carrier of the third planetary gear type change speed device to the input shaft to be rotatable in unison, and
the second clutch being adapted to connect the carrier of the second planetary gear type change speed device to the second sun gear of the second planetary gear type change speed device to be rotatable in unison.

6. A planetary gear type change speed mechanism comprising;
a casing housing the planetary gear type change speed mechanism,
an input shaft,
an output shaft,
a first planetary gear type change speed device including;
a sun gear fixed to the input shaft,
planetary gears meshed with the sun gear,
a carrier supporting the planetary gears, and
a ring gear meshed with the planetary gears,
a second planetary gear type change speed device including;
a first sun gear fixed to the output shaft,
a second sun gear rotatable relative to the output shaft, and
carrier means connected to the carrier of the first gear type change speed device to be rotatable in unison, the carrier means having a first gear portion meshed with the first sun gear and a second gear portion meshed with the second sun gear,
a third planetary gear type change speed device including;
a sun gear fixed to the input shaft,
planetary gears meshed with the sun gear,
a carrier supporting the planetary gears, and
a ring gear meshed with the planetary gears and connected to the carrier of the first planetary gear type change speed device to be rotatable in unison,
a first brake adapted to fix the carrier of the third planetary gear type change speed device to the casing,
a second brake adapted to fix the carrier of the first planetary gear type change speed device to the casing,
a third brake adapted to fix the second sun gear of the second planetary gear type change speed device to the casing,
a first clutch adapted to connect the carrier of the third planetary gear type change speed device to the input shaft to be rotatable in unison, and
a second clutch adapted to connect the carrier of the second planetary gear type change speed device to the second sun gear of the second planetary gear type change speed device to be rotatable in unison.

7. A mechanism as claimed in claim 6 wherein the output shaft is tubularly constructed and the input shaft is mounted in the output shaft to be rotatable relative thereto.

* * * * *